No. 681,982. Patented Sept. 3, 1901.
G. E. SAVAGE.
COOKING UTENSIL.
(Application filed Mar. 5, 1901.)
(No Model.)
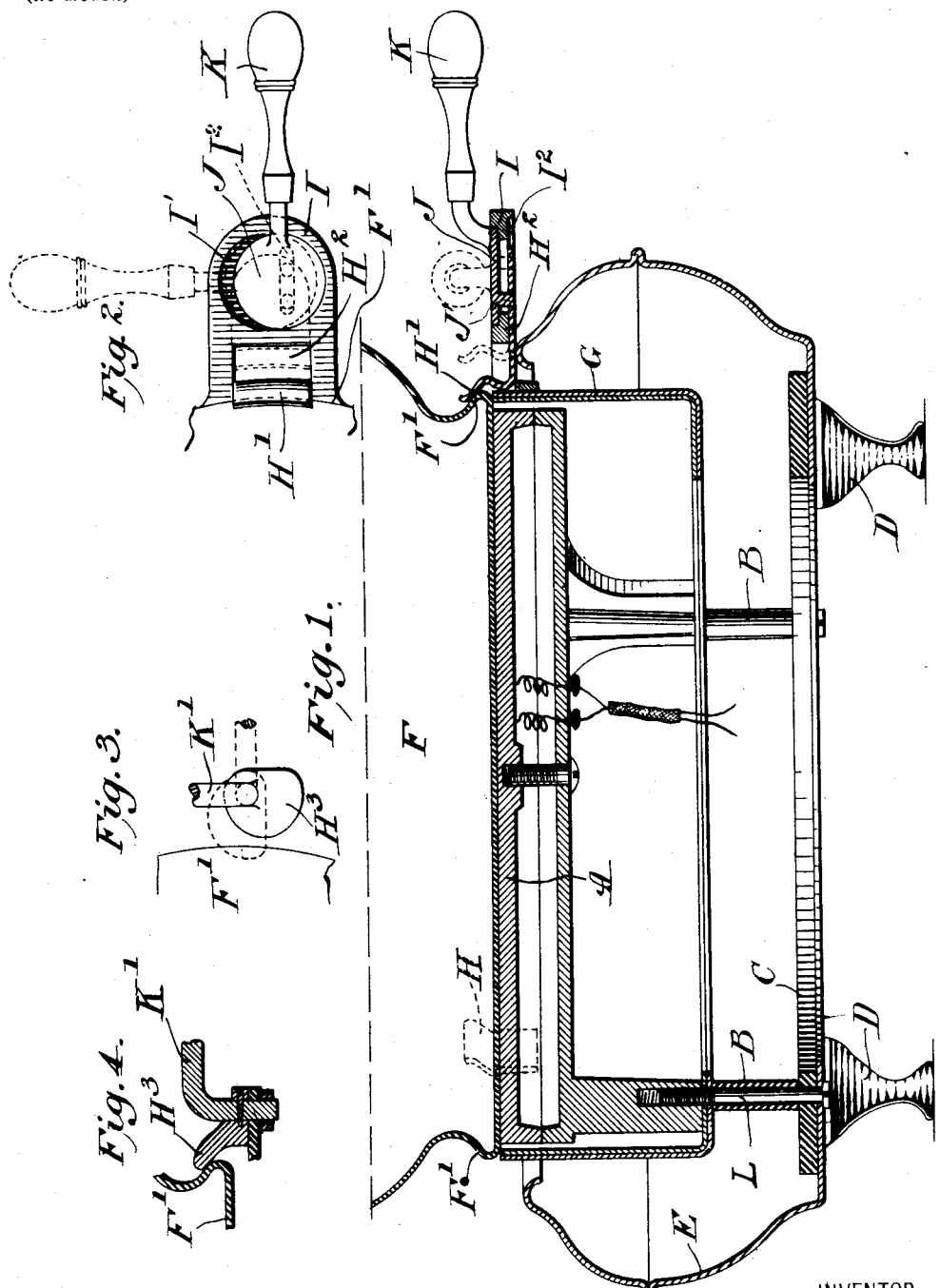
WITNESSES:
INVENTOR
George E. Savage.
BY
ATTORNEY

UNITED STATES PATENT OFFICE.

GEORGE E. SAVAGE, OF MERIDEN, CONNECTICUT.

COOKING UTENSIL.

SPECIFICATION forming part of Letters Patent No. 681,982, dated September 3, 1901.

Application filed March 5, 1901. Serial No. 49,765. (No model.)

*To all whom it may concern:*

Be it known that I, GEORGE E. SAVAGE, a citizen of the United States, residing at Meriden, county of New Haven, State of Connecticut, have invented certain new and useful Improvements in Cooking Utensils, of which the following is a full, clear, and exact description.

My invention relates to electrically-heated cooking utensils.

The object of my invention is to provide a simple, economical, effective, and at the same time graceful means by which a cooking utensil may be secured to a heating device, such as an electric heater, and whereby the parts will be so detachably connected that they cannot become accidentally separated.

Other advantages will be apparent to the mechanic skilled in the art from a reading of the following description of the construction and mode of operation of the apparatus and the various parts thereof.

In the drawings, Figure 1 is a vertical section of the lower part of a cooking utensil mounted upon and secured in place upon an electric heater, which in turn is carried by a suitable frame. Fig. 2 illustrates a plan view of a portion of the device shown in Fig. 1; and Figs. 3 and 4 illustrate, respectively, in plan and section a modified detail of construction.

A is an electric heater, said heater being preferably mounted upon legs B B, in turn preferably carried by a supporting-ring C, which is preferably supported upon legs D D. E is a casing surrounding all of said parts except the legs D and preferably so ornamented or proportioned as to give a graceful appearance to the under body or heater portion of the apparatus.

F is a receptacle—for example, a water-pan of a chafing-dish—the lower portion of which pan is enlarged, so as to form an annular ring or flange $F'$. Obviously this ring or flange may be formed in any desired manner and may be annular or not, as desired.

G is a jacket, preferably of metal, surrounding the heater A and partitioning said heater from the frame or casing E. The jacket G is spaced apart from the casing E sufficiently so that air may circulate between the jacket and the casing, thereby preventing the latter from becoming unnecessarily warm. The jacket G is preferably secured to the heater by fastening the lower portion underneath the legs of the stove, as by the screws L. By this construction the necessary rigidity is obtained and the relative position of the stove-top and the fastening-clips is maintained.

H is a lug or fastening-clip, the upper end of which is turned inwardly, preferably upon an incline, in such manner as to allow the flange $F'$ to be projected thereunder, whereby said flange may be held securely in place when all of the parts are engaged for operation. Any desired number of these clips or fastening-lugs H may be provided. The fastening-lugs H are by preference carried by the jacket G.

$H'$ is a movable fastening-lug corresponding substantially in shape to the clip H. $H^2$ is a slide upon which said lug $H'$ is mounted, said slide $H^2$ being supported in a suitable guiding-frame I, which is in turn supported, preferably, by the jacket G.

J is a cam suitably mounted—as, for example, loosely—in a recess $I'$ of the frame I.

$J'$ is a pin on the lower face of the cam J, which pin may pass through a slot $I^2$ in the frame I and project into operative engagement with the slide $H^2$ of the movable lug $H'$.

By means of the cam J the fastening-lug $H'$ may be moved forward or backward, so as to take either of the positions illustrated in Fig. 1 by the solid or dotted lines, indicating, respectively, the holding and the non-holding position of said lug. K is a handle by which the cam J may be operated to advance or retract said fastening-lug $H'$. When the handle K is moved from the full to the dotted line position of Figs. 1 and 2, the cam J slides along in the recess $I'$, since the pin $J'$, which is attached to the cam, is constrained to move in the slot $I^2$ of the frame. The pin is therefore moved outward, and thus withdraws the lug $H'$ directly from its engagement with the receptacle F. The lugs are preferably yielding and are preferably formed at such an angle as to clamp the receptacle F tighter and tighter to the heater A as the pressure of the fastening-lug $H'$ is increased. Obviously the lugs may be carried by other parts; but I have herein described one convenient method for supporting the same.

In Figs. 3 and 4 I have illustrated a modification in which instead of providing a holding-clip H' separate from the cam J, I have formed the said holding-clip integral with the cam J. In the modified form, H³ represents a holding-clip integral with the cam and which, being mounted eccentric, may be swung into or out of engagement with the receptacle F', a small portion of which is shown in said Figs. 3 and 4. In Fig. 3 I have shown the parts in position to free the holding-lug H³ from the receptacle F'. In the dotted lines in said figure the holding-clip H³ is indicated in position for engagement with said receptacle. The section Fig. 4 is taken of the parts when they are in the position indicated in dotted lines, Fig. 3.

Obviously the cam arrangement and its plane of action may be varied at the will of the mechanic, as may also the other features of construction herein described.

It has been demonstrated in practice that the construction herein described is of very great advantage in that it permits the easy attaching and detaching of the receptacle portion and the heater portion. When attached, the parts are brought into such snug engagement that the heat from the heater portion is transmitted directly and with the least resistance to the receptacle F and its contents. Furthermore, when the parts are engaged they cannot become accidentally disengaged, which obviously is another feature of great importance. The arrangement of the fastening device is such that it presents a graceful appearance.

A feature of importance of the construction herein disclosed resides in the relation of the heater A to the jacket G, and vice versa. These two parts are connected together, so that they are positioned relatively to the same at all times. This is advantageous when the fastening-clips H H' are carried by the jacket G, which, as has been stated herein, is the preferred form. When so carried, the said clips always effectively engage the receptacle F and draw it into a close and firm contact with the heater, the relative position of which with respect to the jacket G being always the same the said clips are not allowed to spring out of place. Obviously the casing E is not absolutely essential in the preferred form. It is present not only to give the proper ornamental effect to the heater, but also to contain and direct the heat toward the receptacle F, thus avoiding waste of energy as well as preventing direct accidental external contact with the heater.

This invention is particularly applicable to chafing-dishes and other cooking utensils.

What I claim is—

1. In a cooking utensil, a heater portion, a receptacle portion, a flange on the lower portion of said receptacle portion, a jacket surrounding said heater portion but separated from the edges thereof, stationary clips carried by said jacket and a movable clip carried by said jacket, said clips coöperating to engage and disengage the flange of said receptacle member.

2. In a cooking utensil, a heater portion, a receptacle portion, a flange on the lower portion of said receptacle portion, a jacket surrounding said heater portion but separated from the edges thereof, stationary clips carried by said jacket and a sliding clip carried by said jacket, said clips coöperating to engage and disengage the flange of said receptacle member.

3. In a cooking utensil, a heater portion, a receptacle portion, a flange on the lower portion of said receptacle portion, a jacket surrounding said heater portion but separated from the edges thereof, stationary spring-clips carried by said jacket and a movable spring-clip carried by said jacket, said clips coöperating to engage and disengage the flange of said receptacle member, and an external annular casing around said heater portion.

Signed at Meriden, Connecticut, this 27th day of February, 1901.

GEORGE E. SAVAGE.

Witnesses:
A. L. STETSON,
GEO. R. DIMOCK.